(12) United States Patent
Barron et al.

(10) Patent No.: US 9,952,975 B2
(45) Date of Patent: Apr. 24, 2018

(54) MEMORY NETWORK TO ROUTE MEMORY TRAFFIC AND I/O TRAFFIC

(71) Applicant: Hewlett-Packard Development Company, L.P., Houston, TX (US)

(72) Inventors: Dwight L. Barron, Houston, TX (US); Paolo Faraboschi, Palo Alto, CA (US); Norman P. Jouppi, Palo Alto, CA (US); Michael R. Krause, Palo Alto, CA (US); Sheng Li, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 254 days.

(21) Appl. No.: 14/785,145

(22) PCT Filed: Apr. 30, 2013

(86) PCT No.: PCT/US2013/038935
§ 371 (c)(1),
(2) Date: Oct. 16, 2015

(87) PCT Pub. No.: WO2014/178854
PCT Pub. Date: Nov. 6, 2014

(65) Prior Publication Data
US 2016/0092362 A1 Mar. 31, 2016

(51) Int. Cl.
*G06F 7/00* (2006.01)
*G06F 12/0831* (2016.01)
*G06F 13/28* (2006.01)
*G06F 13/42* (2006.01)
(Continued)

(52) U.S. Cl.
CPC ...... *G06F 12/0835* (2013.01); *G06F 12/0824* (2013.01); *G06F 13/28* (2013.01); *G06F 13/4022* (2013.01); *G06F 13/4234* (2013.01); *G06F 2212/621* (2013.01)

(58) Field of Classification Search
None
See application file for complete search history.

(56) References Cited

U.S. PATENT DOCUMENTS

| 5,940,870 A * | 8/1999 | Chi ................. G06F 12/0692 709/216 |
| 6,078,337 A * | 6/2000 | Fukui ............... G06F 12/0813 345/505 |
| 6,360,303 B1 | 3/2002 | Wisler et al. |

(Continued)

FOREIGN PATENT DOCUMENTS

JP 2012247901 A 12/2012

OTHER PUBLICATIONS

Energy Efficient IT and Infrastructure for Data Centres and Server Rooms, PrirneEnergyIT Efficient Data Centers, Jul. 2011, 52 Pages.
(Continued)

*Primary Examiner* — Cheng-Yuan Tseng
(74) *Attorney, Agent, or Firm* — Trop, Pruner & Hu, P.C.

(57) ABSTRACT

According to an example, memory traffic including memory access commands is routed between compute nodes and memory nodes in a memory network. Other traffic is also routed in the memory network. The other traffic may include input/output traffic between the compute nodes and peripherals connected to the memory network.

19 Claims, 6 Drawing Sheets

(51) Int. Cl.
*G06F 13/40* (2006.01)
*G06F 12/0817* (2016.01)

(56) References Cited

U.S. PATENT DOCUMENTS

| | | | | |
|---|---|---|---|---|
| 6,553,465 | B1* | 4/2003 | Takusagawa | G06F 11/1666 |
| | | | | 711/115 |
| 6,631,401 | B1* | 10/2003 | Keller | G06F 12/0815 |
| | | | | 709/213 |
| 7,093,078 | B2* | 8/2006 | Kondo | G06F 12/0813 |
| | | | | 709/213 |
| 7,525,904 | B1* | 4/2009 | Li | H04L 12/66 |
| | | | | 370/217 |
| 7,565,475 | B2 | 7/2009 | Purcell et al. | |
| 7,617,329 | B2* | 11/2009 | Quach | G06F 15/17375 |
| | | | | 709/230 |
| 7,734,741 | B2* | 6/2010 | Ayyar | G06F 13/4081 |
| | | | | 709/200 |
| 7,788,310 | B2 | 8/2010 | Eleitheriou et al. | |
| 7,975,109 | B2* | 7/2011 | McWilliams | G06F 12/0284 |
| | | | | 711/141 |
| 8,438,578 | B2* | 5/2013 | Hoover | H04L 45/00 |
| | | | | 712/32 |
| 8,812,795 | B2* | 8/2014 | Pong | G06F 12/0284 |
| | | | | 709/223 |
| 8,959,290 | B2* | 2/2015 | Rajagopalan | G06F 12/0808 |
| | | | | 711/141 |
| 9,264,341 | B2* | 2/2016 | Ma | H04L 45/00 |
| 9,442,879 | B2* | 9/2016 | Safranek | G06F 13/14 |
| 9,823,986 | B2 | 11/2017 | Li | |
| 2002/0087500 | A1 | 7/2002 | Berkowitz et al. | |
| 2009/0019258 | A1 | 1/2009 | Shi | |
| 2010/0211721 | A1* | 8/2010 | Resnick | G06F 12/00 |
| | | | | 711/103 |
| 2010/0306227 | A1 | 12/2010 | Fleming et al. | |
| 2011/0289485 | A1* | 11/2011 | Mejdrich | G06F 11/3636 |
| | | | | 717/128 |
| 2012/0209891 | A1 | 8/2012 | Kumagai et al. | |
| 2013/0215069 | A1* | 8/2013 | Lee | G06F 1/1626 |
| | | | | 345/173 |
| 2016/0034195 | A1 | 2/2016 | Li | |
| 2016/0054944 | A1* | 2/2016 | Herrell | G06F 3/061 |
| | | | | 711/154 |
| 2016/0055012 | A1* | 2/2016 | Schumacher | G06F 9/4406 |
| | | | | 713/100 |

OTHER PUBLICATIONS

IBM, IBM and SAP create the world's largest SAP HANA system, Retrieved May 3, 2013, 2 Pages.
International Searching Authority, The International Search Report and the Written Opinion, dated Jan. 23, 2014 11 Pages.
Lim, Kevin, et al, Disaggregated Memory for Expansion and Sharing in Blade Servers, ISCA Jun. 20-24, 2009, 12 Pages.
Pawlowski, J. Thomas, Hybrid Memory Cube (HMC), Hot Chips 23, Aug. 4, 2011, 7 Pages.
Therdsteerasukdi, Kanit, et al., "Utilizing Radio-Frequency Interconnect for a Many-DIMM DRAM System", Jun. 2012, 18 Pages.
IBM and SAP create the world's largest SAP HANA system—100 terabytes of main memory dated on or before Apr. 5, 2013 (3 pages).
J. Thomas Pawlowskl, Hybrid Memory Cube (HMC), Hot 23 Chips Aug. 4, 2011 (24 pages).
Jain et al., A 1.2 GHz Alpha microprocessor with 44.8 GB/s chip pin bandwidth, Abstract Only, 2001 (6 pages).
Kongetira et al., Niagara: A 32-Way Multithreaded SPARC Processor, IEEE 2005 (9 pages).
O'Krafka et al., An empirical evaluation of two memory-efficient directory methods, Abstract Only, 1990 (4 pages).

* cited by examiner

MEMORY NETWORK TO ROUTE MEMORY TRAFFIC AND I/O TRAFFIC

CROSS-REFERENCE TO RELATED APPLICATIONS

The present application is related to patent application PCT/US2013/38937 entitled "Memory Network" by Li et al., and to patent application PCT/US2013/38936 entitled "Memory Node Error Correction" by Li et al., both of which are filed concurrently with the present application and are assigned to the same assignee as the present application.

BACKGROUND

Computer networks and systems have become indispensable tools for modern business. Today terabytes of information on virtually every subject imaginable are stored and accessed across networks. Some applications, such as telecommunication network applications, mobile advertising, social media applications, etc., demand short response times for their data. As a result, new memory-based implementations of programs, such as in-memory databases, are being employed in an effort to provide the desired faster response times. These memory-intensive programs primarily rely on large amounts of directly addressable physical memory (e.g., random access memory) for storing terabytes of data rather than traditional hard drives to reduce response times.

BRIEF DESCRIPTION OF DRAWINGS

The embodiments are described in detail in the following description with reference to examples shown in the following figures.

DETAILED DESCRIPTION OF EMBODIMENTS

Figure 1:
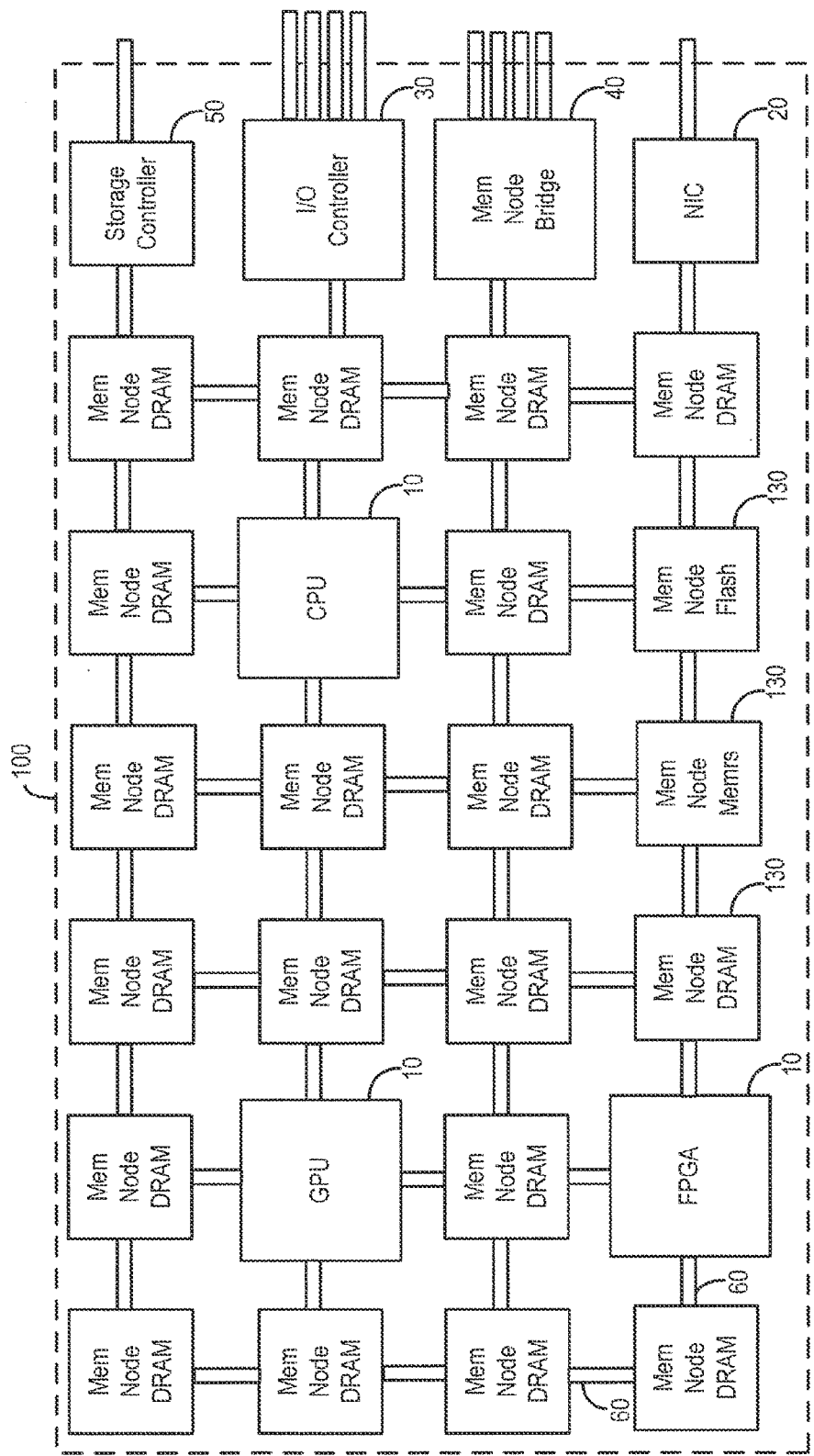
FIG. 1 illustrates a memory network.

For simplicity and illustrative purposes, the principles of the embodiments are described by referring mainly to examples thereof. In the following description, numerous specific details are set forth in order to provide a thorough understanding of the embodiments. It is apparent that the embodiments may be practiced without limitation to all the specific details. Also, the embodiments may be used together in various combinations.

A memory network, according to an example, includes memory nodes that may be connected via high-speed interconnects, such as high-speed point-to-point links. Processors connected to the memory network may use the memory network as main memory. For example, a main memory controller for a processor may perform memory access operations in the memory network to read and write data from memory nodes storing data for the processor.

Also, each memory node may be a memory subsystem including a co-memory controller and memory to store data. The memory node may also include routing logic to route data or memory access commands to a destination, which may be another memory node in the memory network. Thus, the memory network can act both as a scalable, high-performance memory pool and as a network for supporting data transmission between memory nodes in the memory network and between processors and the memory nodes.

In addition, the memory network provides a unified memory system that can serve as the same physical infrastructure for both the memory system and a system fabric. The physical infrastructure, including the nodes and links in the memory network, supports both memory traffic and other types of traffic including input/output (I/O) traffic at the same time. For example, the memory network can act both as a scalable high-performance memory pool and as a substrate for supporting data transmission between processors via the memory network and between processors and I/O systems via the memory network.

The memory network supports memory traffic, such as memory access commands, and messages for cache coherency or non-coherent protocols. The memory traffic may be between compute nodes (e.g., processors) and between compute nodes and memory nodes. The memory network also supports I/O traffic between compute nodes and peripherals. The I/O traffic may include network and storage traffic for example between processors, network interface controllers (NICs), storage devices, and bridging devices bridging networks. Since the memory network can support both memory traffic and I/O traffic, dedicated I/O channels may be eliminated, and a processor may use the same set of physical pins in the processor socket for both memory traffic and I/O traffic. This allows for denser and highly integrated systems with much fewer channels and pins.

Additionally, the memory network facilitates memory capacity scalability. To scale the memory network, additional memory nodes may be added to the memory network and connected to existing memory nodes for example via point-to-point links. The memory network, given its scalability can support large capacity and high bandwidth, big-data applications, such as in-memory databases.

FIG. 1 shows a memory network 100. The memory network 100 includes nodes, which may include memory nodes 130 and non-memory nodes. The non-memory nodes may include compute nodes 10, and I/O nodes. The I/O nodes may be a node that connects the compute nodes 10 and/or memory nodes 130 to a peripheral or another network. For example, the I/O nodes may include a NIC 20, I/O controller 30, memory node bridge 40, a storage controller 50 and/or other types of nodes.

The compute nodes 10 may include a circuit to perform computations, such as a processor or multicore processor which may be provided in a chip such as a central processing unit (CPU) socket. Other examples of compute nodes are a graphics processing unit (GPU), field-programmable gate array (FPGA), etc.

Regarding the I/O nodes, the storage controller 50 may connect the compute nodes 10 to a storage device, such as a hard disk or other storage device. The I/O controller 30 may manage data communications between the compute nodes 10, such as processors, and other components. The memory node bridge 40 may connect the memory network 100 to another memory network which may have the same or a heterogeneous infrastructure. For example, the memory node bridge 40 is an edge device that communicates to an external memory network. The memory node bridge 40 may format messages for the destination network if it uses a different message format, and connect to a different physical medium, such as connecting from copper to fiber optics, if the external memory network uses a different medium. The MC 20 connects the compute nodes 10 to an external network, such as a local area network or a wide area network to send or receive network traffic.

The memory nodes 130 may include dynamic random-access memory (DRAM), memristor, flash memory, non-volatile memory or other types of memory. The memory network 100 includes links 60 connecting the nodes in the memory network 100 with each other. The links 60 may be point-to-point links as described with respect to FIG. 2. The memory nodes 130 may operate as a shared memory for the compute nodes 10, and the memory nodes 130 execute memory access commands for the compute nodes 10. The shared memory may be a global shared memory for all the compute nodes 10 or may be a partitioned shared memory as described in further detail below.

In one example, the memory nodes 130 and the links 60, which form the system fabric for the memory network 100, are the core building blocks of the memory network 100, and the non-memory nodes, including the processors, are peripherals. The compute nodes 10 may utilize the memory nodes 130 as main memory for their memory system. Data may be manipulated in place at a memory node by commands issued by the non-memory nodes to minimize data traffic. Also, I/O operations may be performed as memory queue operations, and network addresses may be translated to memory addresses to send data to a destination in the memory network 100. For example, instead of sending data from a processor to a NIC, the processor sends a pointer to the data stored in a memory node to the NIC in a network message, and the MC fetches the data from the memory node using the pointer. The physical infrastructure, including the nodes and links 60 in the memory network 100 support memory traffic and I/O traffic.

FIG. 1 shows an abstract view of the memory network 100. The memory network 100 may employ different topologies and may be hierarchical as is described in further detail below.

Figure 2:
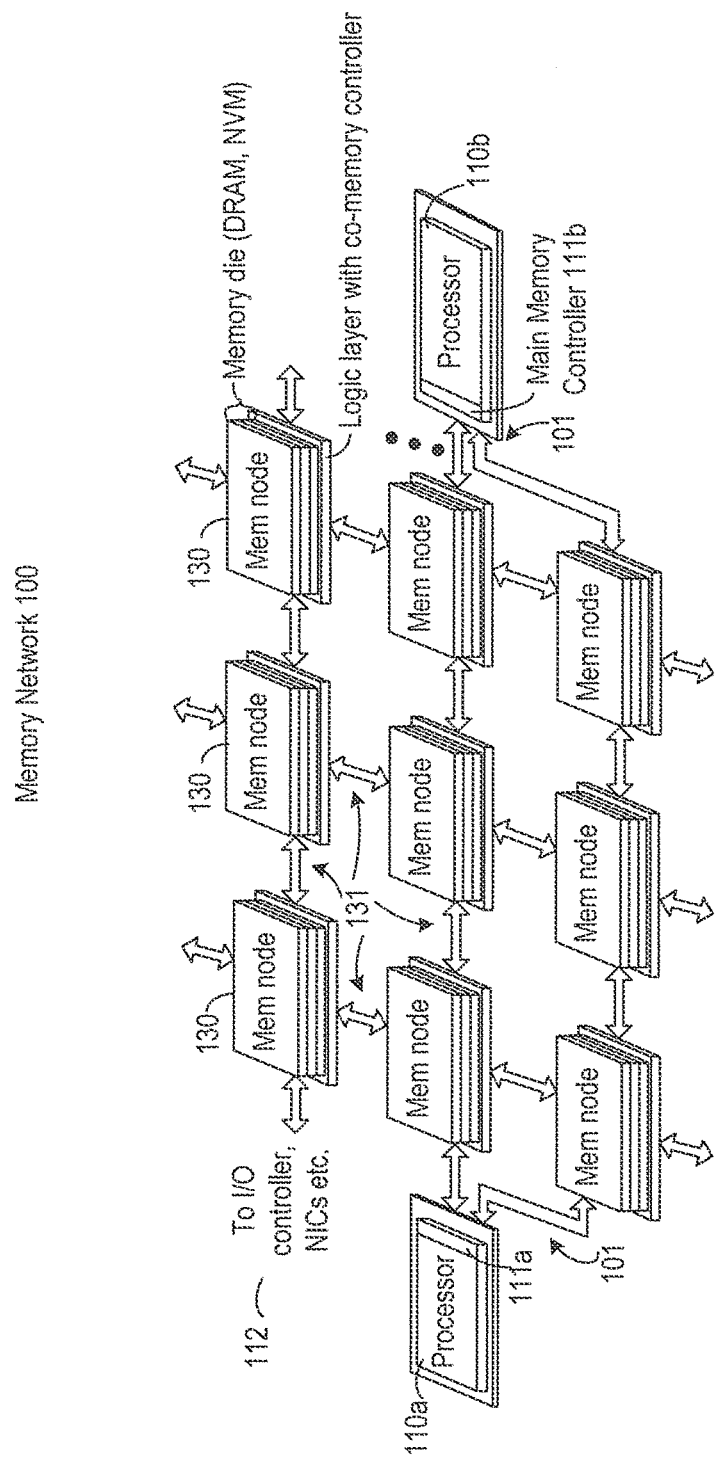
FIG. 2 illustrates the memory network shown in FIG. 1 showing processors with memory controllers connected to memory nodes.

FIG. 2 shows an example of the memory network 100 including processors 110*a-b*, which are compute nodes, and main memory controllers 111*a-b* for the processors 110*a-b* respectively. The memory network 100 includes point-to-point links 101 for the links 60 shown in FIG. 1. A point-to-point link is a wire or other connection medium that links two circuits. In one example, a point-to-point link connects only two circuits which is unlike a shared bus or crossbar switches that connect more than two circuits or devices. A processor and main memory controller, such as 110*a* and 111*a* or 110*b* and 111*b*, may be provided on the same chip, or may be provided on separate chips. Also, more or fewer processors, main memory controllers and memory nodes than shown in FIG. 1 may be used in the memory network 100. Also, any circuit 112 that may use memory, other than processors 110*a-b*, may be connected to the memory network 100. Each of the processors 110*a-b* runs an operating environment (e.g., OS, hypervisor, machine monitor, etc.) that may execute page management mechanisms and perform other functions.

The memory nodes 130 may also be connected together via point-to-point links 131, which are inter-node point-to-point links. Each memory node can operate as a destination of a memory access if the data to be accessed is stored at the memory node, and as a router that forwards a memory access command to its appropriate destination memory node if the data to be accessed is at a different memory node. For example, the main memory controllers 111*a-b* can send memory access commands, e.g., read, write, copy, etc., to the memory nodes 130 to perform memory accesses for the processors 110*a-b*. Each memory node receiving a command may execute the command if it is the destination or route the command to its destination memory node, as is further described below. The memory network 100 provides memory scalability through the point-to-point links 131 and through the ability to add memory nodes as needed, which satisfies the memory capacity requirements of big-data workloads. Scaling up memory capacity in the memory network 100 is as easy as cascading additional memory nodes. Moreover, since the memory capacity expansion in the memory network 100 is through memory channels, e.g., the point-to-point links 131, rather than dedicated I/O channels, it requires minimum modifications to the hardware and operating system.

Figure 3:
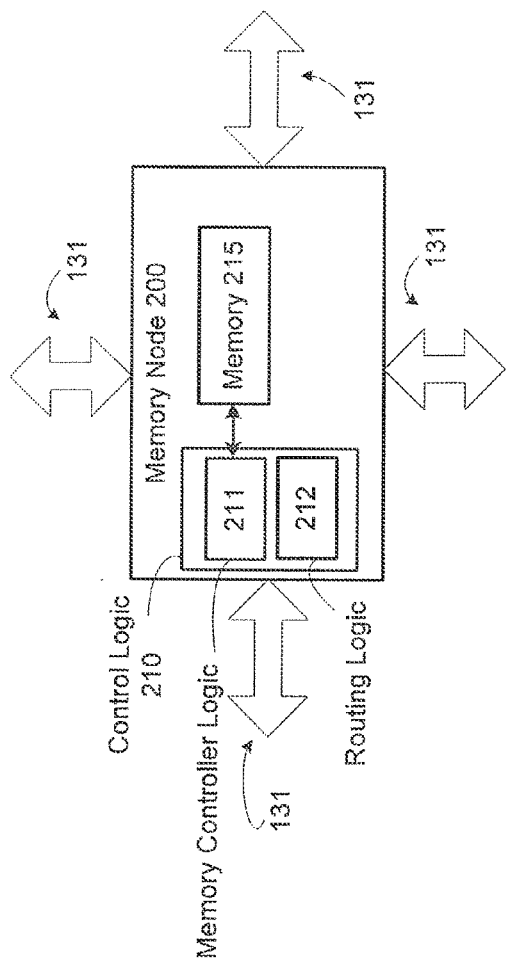
FIG. 3 illustrates a block diagram of a memory node.

FIG. 3 shows a block diagram of the memory node 200 which may represent any of the memory nodes 130 shown in FIG. 1. The memory node 200 includes control logic 210 and memory 215. The memory 215 may be dynamic random-access memory (DRAM) or any type of semiconductor memory that is volatile or nonvolatile. The control logic 210 may include memory controller logic 211 and routing logic 212. The memory controller logic 211 is also referred to as a co-memory controller or co-located memory controller. The control logic 210 may include hardware that can execute machine readable instructions stored on a storage medium. The memory controller logic 211 and routing logic 212 may be implemented by two separate hardware circuits or the same circuit. The memory controller logic 211 performs the operations of a memory controller for the memory 215 including memory access operations. The routing logic 212 receives memory access commands, determines whether it is the destination, and sends the memory access commands to the memory controller logic 211 for execution if it is the destination. If the memory node is not the destination, the routing logic 212 sends the memory access commands to a next hop in the memory network toward the destination. Various routing protocols may be used for routing.

Figure 4:
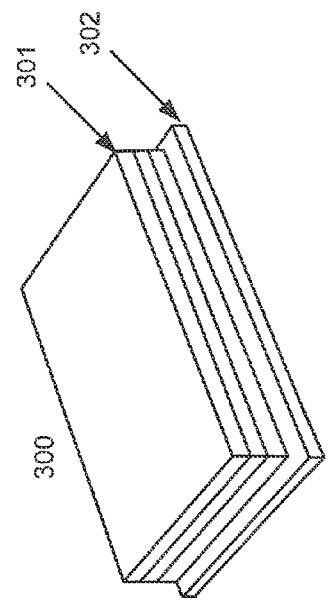
FIG. 4 illustrates a stacked memory node.
Figure 5:
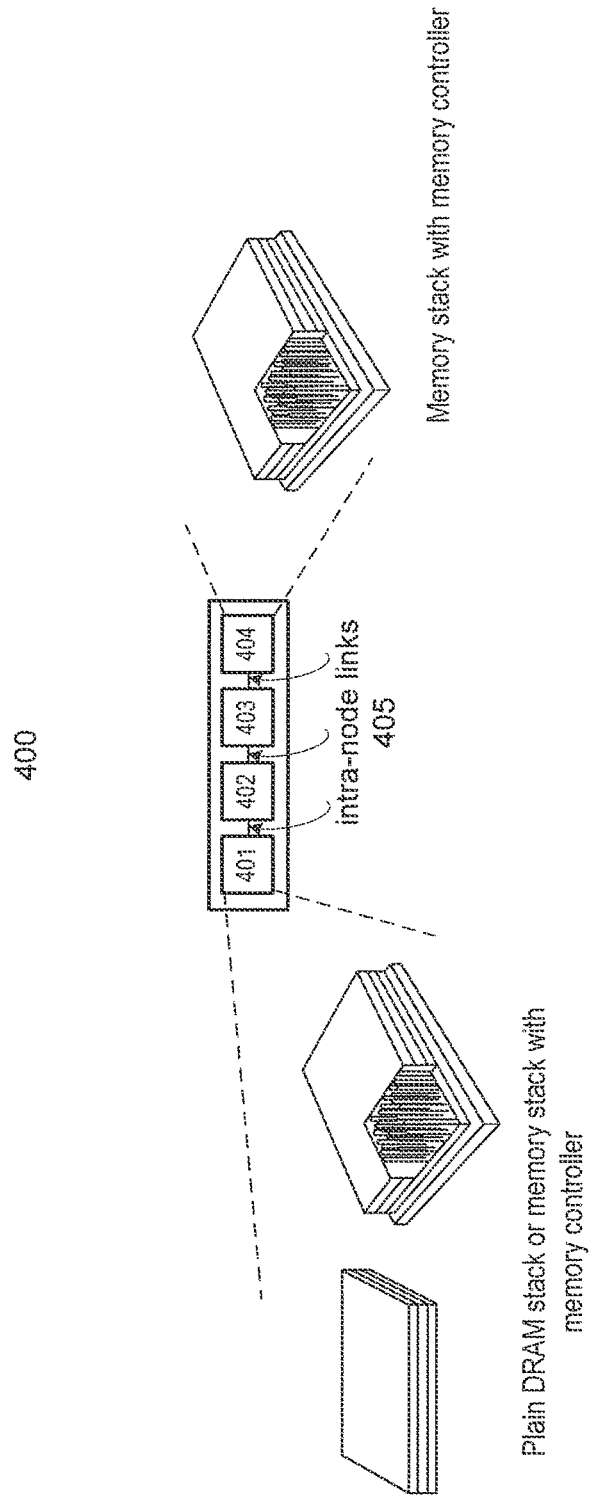
FIG. 5 illustrates a memory node with multiple stacked memories.

In one example, the memory node 200 may be a multi-dimensional stacked memory, such as 2.5D or 3D or any number of dimensions. A memory node may include multiple memory chips packaged in a single component, such as stacked memory or another form of co-packaged memory. FIG. 4 shows an example of a 3D stacked dynamic random-access memory (DRAM) that may be used as a memory node. For example, the 3D stacked DRAM 300 may include multiple layers of dense memory die 301 with a base logic layer 302. The 3D stacked DRAM 300 may include through silicon via (TSV) channels for transferring data from a DRAM in the memory die 301 to the base logic layer 302. The base logic layer 302 includes the control logic 210 shown in FIG. 1. In another example, the memory node 200 may include multiple memory stacks, and each memory stack is connected via intra-node links. For example, FIG. 5 shows a block diagram of a multi-stack memory node 400 that may be used as a memory node in the memory network 100. In this example, the memory node 400 includes memory stacks 401-404 but a memory node may have less than four or more than four memory stacks. At least one of the stacks has a co-memory controller. For example, stack 401 includes a base logic layer such as shown in FIG. 4. The base logic layer may include the control logic 210 that includes memory controller logic 211 and routing logic 212 of FIG. 3. The other stacks may or may not include control logic. For example, stack 404 is a plain DRAM stack without control logic and stack 403 has control logic. The stacks 401-404 are connected via intra-node links 405.

The memory network 100 may be included in a hierarchy of memory subsystems. For example, an upper level of the hierarchy includes memory subsystems for the processors 110*a-b*, which may include the main memory controllers 111*a-b* and the memory nodes 130 operating as memory for main memory controllers 111*a-b*. A lower level of the hierarchy includes the memory subsystem in each memory node. FIGS. 3-5 show examples of memory subsystems for the memory nodes.

A decoupled memory interface is used for the hierarchy of memory subsystems. A decoupled memory interface for example means that there is no single central memory controller for all the memory subsystems. Instead, the memory controllers are distributed, such as the main memory controllers 111*a-b* for the processors 110*a-b* and the memory controller logic 211 for each of the memory nodes. Also, memory access requests in the memory network 100 are asynchronous and non-deterministic in that the time a response is received for a memory access request may not be predetermined, such as due to the routing of a memory access request in the memory network. This is different than conventional memory systems where the controller typically expects a response to a memory access command in a certain number of cycles.

In the decoupled memory interface design employed by the hierarchical memory subsystems, the main memory controllers of the processors and the co-memory controllers of the memory nodes use an abstracted protocol for communication. For example, the processor-side main memory controller (e.g., main memory controller 111*a* or 111*b* shown in FIG. 2) is responsible for sending the high-level memory access commands such as read, write, and block copy, from the processor to the memory network 100 where it is routed to the destination memory node.

The memory network 100 may be provided in multiple configurations in a hierarchy. For example, the memory network 100 may be provided as a small-scale memory network connected to the processors on the same computer blade server, and/or may be provided in an enclosure with both compute and memory blades connected by backplane links, and/or may be provided in remote hybrid or pure-memory enclosures connected with a high-level network and/or remote server enclosures connected to the memory network 100 via a NIC. The topologies of the memory network at all levels may be the same or different, such as mesh, torus, tree, etc. The memory network 100 shown in FIG. 2 is an example of a 2D mesh topology.

In the memory network 100, for example as shown in FIGS. 1 and 2, the compute nodes 10 can be placed at multiple locations such as co-located in the same blade together with memory nodes; residing in the same enclosure but on different blades (e.g. separated as compute blades and memory blades); and distributed in different enclosures. For all the different compute node placement options, physical channels, such as links 60 shown in FIG. 1, inside the memory network 100 connect the nodes in the memory network 100 with each other. Also, for all the different compute node placements, the memory network 100 may function as a shared memory for the compute nodes 10.

The shared memory network 100 can be used to efficiently implement different memory models including shared and coherent memory, shared non coherent memory, and distributed non-shared memory.

The memory network 100 may be a shared and coherent memory multiprocessor system, such as the memory network 100 functioning as a shared memory with a cache coherency protocol for the processors 110*a-b*. For each processor with a private cache, it is possible to have many copies of a data block, such as one copy in a memory node and one or more copies in the caches. When one copy is changed, the other copies must be changed also.

Cache coherency protocols for shared memory may be implemented by the memory network 100. For a cache coherency protocol, the processors may run the same OS or hypervisor, and treat the memory network 100 as a single shared memory space where coherence is guaranteed through hardware-supported cache coherence mechanisms.

Cache coherency protocols may be snoop-based or directory-based coherence protocols. For snoop-based coherence protocols, the memory network 100 can be used for broadcasting coherence messages among the processors. Because of the limited scalability of snoop-based coherence, directory-based coherence is often used in large scale shared memory systems.

For directory-based coherence, the memory nodes 130 may include directory controllers implemented for example by the memory controller logic 211 shown in FIG. 3. The directory controllers store a cache coherence directory that maintains the coherence between caches. The directory may include entries for each data block (e.g. a cache line) in the memory network to indicate the status of the data block and the owner(s)/sharer(s) of each data block. The directory may be distributed across the memory nodes 130 by address interleaving. A memory node including its directory controller and directory is also referred to a home node of certain address range. In one example, the memory network 100 represents a shared global address space for the processors connected to the memory network 100, and the entries include the global addresses and sharers of the addresses. There could be one or more sharers for each address. A sharer may include any processor that stores a data block in its private cache. An entry for an address may include a bit-vector to indicate the sharers. The entry can also indicate whether the data block stored in a memory node is dirty or clean. A processor checks the directory prior to loading a data block from a memory node to its cache. When an entry is changed, the directory either updates or invalidates the other caches with that entry. The directory may be stored in DRAM if it is stored in a DRAM memory node. However, the directory may be stored in fast directory caches to improve performance.

The directory-based cache coherency may use reversed directories to minimize the amount of directory information stored in the memory nodes 130. For example, the directory may only store information for data blocks in addresses that are cached rather than information for all the memory addresses. This may reduce the overhead and improve the scalability.

Figure 6:
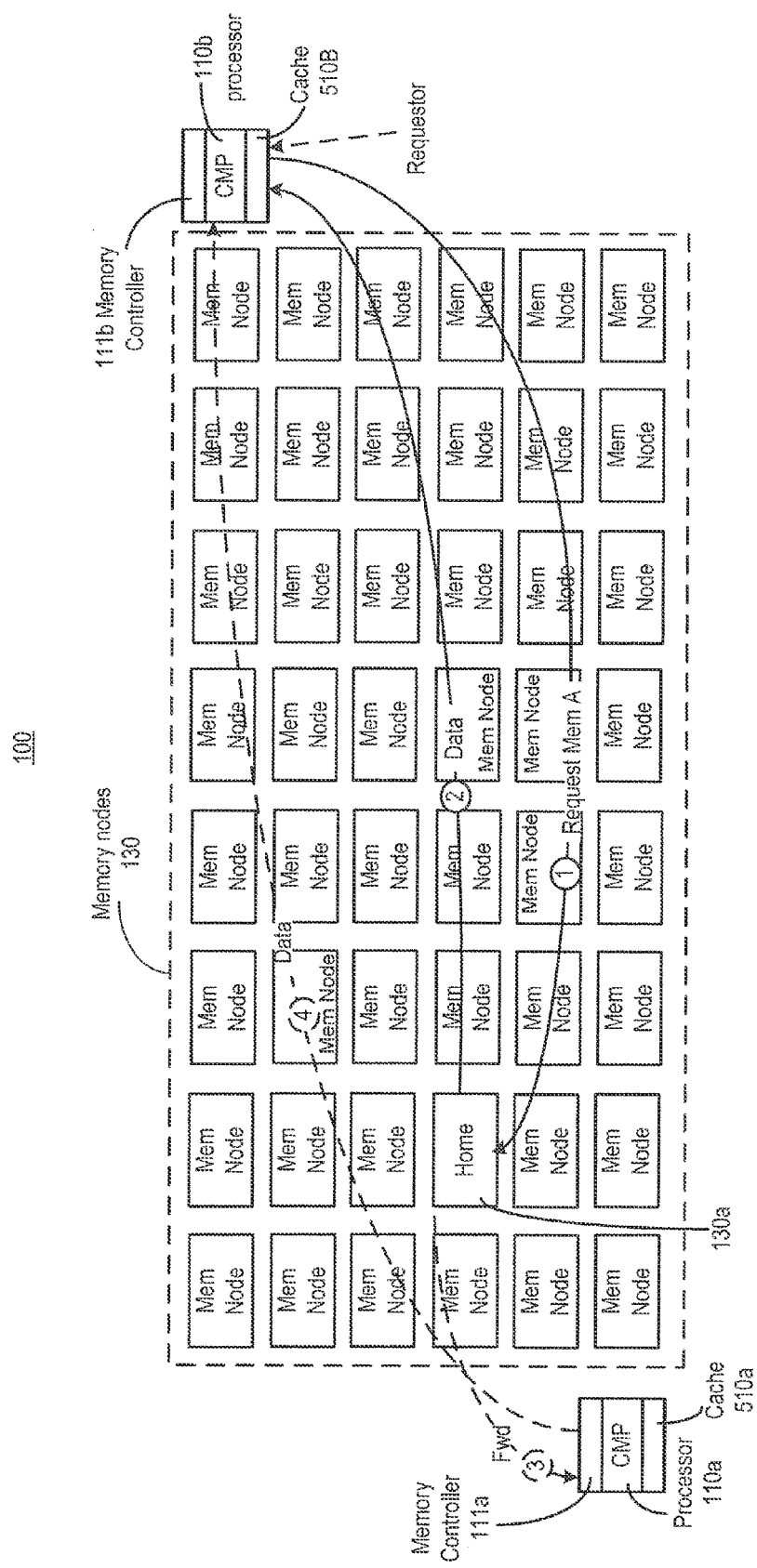
FIG. 6 illustrates message exchange for cache coherency.

FIG. 6 describes messages and data exchanged for a directory-based cache coherence protocol in the memory network 100. In the example shown in FIG. 6, the memory nodes 130 and processors 110*a* and 110*b* from FIG. 2 are shown. The processors 110*a* and 110*b* have local caches 510*a* and 510*b* respectively. The processors 110*a* and 110*b* may be in chip multiprocessors (CMPs). Each processor is a potential sharer of a cache block stored in a memory node.

A miss on a last level cache at the processor can trigger a request to the shared memory network 100 for the data block. For example, a cache miss in the cache 510*b* triggers the processor 110*b* to send a request through its main memory controller 111*b* to the memory node storing the data block (i.e. the home node), which in this example is the memory node 130*a*. The sending of the request is illustrated in FIG. 5 as step 1, "Request Mem A". To identify the memory node to send the request, the main memory controller 111b may determine the global address of the data to identify the home memory node to send the request, which in this example is memory node 130a. The processor 110a generates a packet with the read request to send to the memory node 130a. The packet may include a source address of the processor 110a and a destination address and an indication that the packet is for a read operation. The packet may include the global address of the data to be read. The main memory controller 111b sends the packet to the memory node 130a. The packet is routed to the memory node 130a by intermediate memory nodes in the path between the processor 110b and the memory node 130a.

The directory information is retrieved by the co-memory controller of the memory node 130a. If the requested data block is up-to-date in the memory node 130, the co-memory controller of the memory node 130a sends the data block to the requestor, which is processor 110b. This is shown as step 2 in FIG. 5 with the "Data" being sent from the memory node 130a to the processor 110b. The data may be in a packet and routed in the memory network 100 to the processor 110b. The home memory node also updates the directory information to add the requesting processor as a sharer (if read) or an owner (if write).

If the requested data block in the memory node 130a is not up-to-date and owned by another processor, such as the processor 110a, the co-memory controller of the memory node 130a initiates coherence traffic to the processor 110b that owns the data block. This is shown as step 3, "FWD". The coherency traffic includes a message that is routed from the memory node 130a to the processor 110a via the memory network 100. The message may be provided in a packet and may identify the requested data. The requested data block is then retrieved from the owner's cache 510a and routed via the memory network 100 to the requestor processor 110b. The processor 110a may then write the data block from its cache 510a to the memory node 130a and entry in the directory is changed according to the coherence protocol to indicate the data block stored in the memory node 130a is clean.

As shown in FIG. 6, the memory network 100 routes memory traffic including coherence traffic over the same network. Also, a memory transaction and its associated coherence transaction can be combined as one transaction. For example, in the memory network 100, a miss on a last level cache can initiate a transaction of a memory load as well as a directory lookup. The co-memory controller of the memory node checks the directory first and then may determine where and how to return the data to the requestor as shown in FIG. 6. Also, a memory access can be combined with an irrelevant coherent message in a single transaction or packet if the memory access and the irrelevant coherent message are for the same destination memory node and the combining does not cause a conflict.

Separate protocol-level virtual channels may be used to avoid deadlocks in transaction protocols. Inside a protocol-level virtual channel, multiple virtual channels may be used to avoid deadlock within the network hardware and improve the network performance. During channel arbitration, the memory network 100 can prioritize cache coherence traffic over other memory traffic since coherence traffic can have a higher impact on system performance.

The proposed memory network 100 can also support non-coherent systems, including shared non-coherent memory system and non-shared memory system. Under this paradigm, the memory network 100 supports GAS (Global Address Space, shared but non-coherent) and/or Message-Passing (separate address spaces, explicit communication channel). Since the memory network 100 uses high speed links for inter-memory node communication and memory of different domains are physically and directly connected through extended memory channels, these communications can be done much faster than through today's I/O paths in conventional systems. For a GAS programming model, processors are non-cache-coherent but with direct connections to the same memory network. Thus, the processor can directly access remote memory with RDMA (remote direct data memory access) type acceses, and may be performed by unidirectional (put/get) communication. The RDMA communication is supported directly on the memory network 100 without a separate memory channel (that is required in the conventional memory systems). These primitives are examples of memory traffic in the memory network 100 for GAS. Also, in the shared but non-coherent mode (e.g. GAS), the remote processor may execute a cache flush to the memory prior to allowing another processor to access the shared memory to fetch the up-to-date data.

Message-passing is another example of a non-coherent protocol memory system. It is also a non-shared memory system where each processor has its own private memory address space, and there is no direct communication among memory spaces. Message-passing is commonly used on distributed machines with separate memory for executing parallel applications. For message-passing, each executing process communicates and shares its data with others by sending and receiving I/O messages over the network. In the memory network 100, for message-passing based communication primitives, such as send and receive, the data blocks allocated to a message can simply be transferred by reference such as through a pointer to an address in shared memory. For example, when a message sender completes the composition (write) of the message in a data block in memory and ensures that all buffering (in software or hardware caches) has committed to the memory in the memory network 100, it can simply relinquish the write-ownership of the data block and pass the block handle (e.g., its pointer) to the receiver. The receiver of the message can interpret the handle and, after taking ownership of the block, it can either fetch the data through the memory network 100 based on the pointer, or simply use it in place. When actual data copies are needed (such as in copy-on-write scenarios), the memory node can perform a direct data transfer from one memory node to another.

The non-coherent mode and coherent mode can also be applied hierarchically, where multiple coherent domains coexist in the memory network 100. While intra-domain communication is done through coherent shared memory, the inter-domain communication can be done through message-passing or shared but non-coherent protocols and programming models such as partitioned global address space (PGAS).

The physical infrastructure of the memory network 100, including the nodes and the links 60 shown in FIG. 1, provide a unified memory system and system fabric that can serve as the physical infrastructure for both a memory system and a system fabric. The physical infrastructure supports memory traffic and other types of traffic including I/O traffic. The memory traffic may include memory access commands, such as read, write, block copy, etc., sent to the memory nodes 130 from the compute nodes 10 shown in FIG. 1 and responses to the memory access commands. The memory traffic may also include messages for cache coherency protocols and auxiliary control messages for non-coherent memory sharing such as an enforced cache line flush command. I/O traffic may include traffic between the compute nodes 10 and I/O nodes such as the NIC 20, the I/O controller 30, the memory node bridge 40 shown in FIG. 1 and/or other types of nodes. The traffic may be sent in packets via the memory network 100. In a traditional computing system, the memory traffic and I/O traffic are routed through different paths. For example, when a processor needs to send a network message to another processor, it first prepares the data memory, assembles it into network packets, then invokes the NIC attached at the I/O channel (e.g. PCIe). Data is stored where the MC can access it, and then the MC at the I/O path sends out the data packet to another processor.

In the memory network 100, the I/O (e.g. network) traffic may be sent as packets in the memory network 100 using a memory address as a destination address. The memory address may be a global address for a non-partitioned shared memory space or a memory address of a partitioned address space. The memory nodes 130 may route packets in the memory network 100 towards their destination for example using a routing table that indicates a next hop for a packet having a particular destination. For example, if a memory address in the memory network 100 is used as a destination address, the routing table may contain destination memory address/next hop associations so the routing logic can route packets toward their destinations. When transferring network messages, the memory network 100 can simply transfer a handle of the memory block (e.g. a pointer to the block). If direct cache access is not supported, the memory block must be flushed to memory before a remote node can get the data, otherwise the remote receiver can get the data directly from the sender's cache to improve performance. The remote receiver (processor or other I/O device) can fetch the data through the memory network 100 based on the handle, or simply use it in place. In this case, the network traffic is converted to remote memory traffic while maintaining the legacy software interface (e.g. Ethernet library). NICs treat all the memory nodes 130 in the memory network 100 as potential virtual queues for their packets. Outbound packets can be done by sending pointers of the memory block in the virtual queues to the NIC. Then the NIC can fetch the data using the pointers and sent outbound. Inbound packets can be handled in the similar way, where NICs can allocate a virtual queue in the memory space, store inbound packets, and send the pointers to the designate processor inside the memory network. Furthermore, nodes may be made aware of the memory fabric topology in order to optimize data placement according to specific application usage models. For example, an I/O controller may separate header and data contents of I/O traffic so as to place the header and/or data payloads closest to one of multiple compute nodes that will ultimately process the data. The I/O nodes may also choose different types of memory semantics for different portions of the I/O processing. Command headers notifying the presence of I/O work to be done or completed may be placed in cache-coherent regions of memory to support multiple instances of readers and writers on a queue, while data payloads may be placed in non-coherent memory regions to avoid cache coherency overhead.

Figure 7:
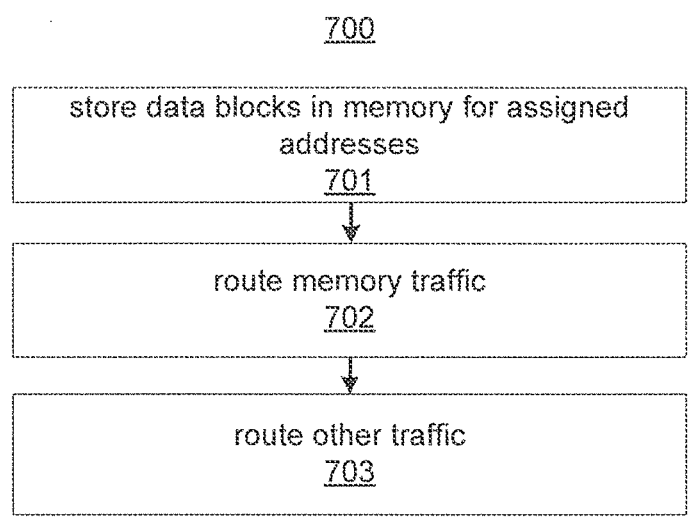
FIG. 7 illustrates a flow chart of a method.

FIG. 7 illustrates a method 700 for example executed by one of the memory nodes 130 shown in FIGS. 1-6. At 701, the memory stores data blocks in its memory. The data blocks may be for addresses assigned to the memory node in the shared memory implemented by the memory nodes 130 for the compute nodes 10. At 702, the memory node routes memory traffic in the memory network 100. At 703, the memory node routes other traffic towards its destination in the memory network 100. In addition to basic memory traffic (e.g. read, write), the other traffic may include coherency traffic and I/O traffic between the compute nodes and peripherals connected to the memory network 100.

While the embodiments have been described with reference to examples, various modifications to the described embodiments may be made without departing from the scope of the claimed features.

What is claimed is:

1. A memory network comprising:
memory nodes to provide shared memory for compute nodes and execute memory access commands for the compute nodes; and
links connecting the memory nodes and connecting the memory nodes and the compute nodes,
wherein a first memory node of the memory nodes is to:
route memory traffic including a first memory access command between a first compute node of the compute nodes and a second memory node of the memory nodes via the links in the memory network,
route input/output (I/O) traffic between the first compute node and a peripheral via the links in the memory network,
combine the first memory access command and a cache coherency message associated with the first memory access command into a single transaction, and
send the single transaction to the second memory node in the memory network.

2. The memory network of claim 1, wherein the first compute node is to cache data in a local memory and is to store the cached data in the second memory node, and the cache coherency message is to implement a cache coherency protocol.

3. The memory network of claim 2, wherein the cache coherency protocol comprises a directory-based cache coherency protocol, and for the directory-based cache coherency protocol, the first memory node includes a directory controller to maintain a directory to indicate cache coherence among the compute nodes.

4. The memory network of claim 2, wherein the cache coherency protocol is a non-coherent protocol that comprises a global address space protocol in the memory network.

5. The memory network of claim 2, wherein the cache coherency protocol is a non-coherent protocol that comprises a message passing protocol in the memory network.

6. The memory network of claim 1, wherein the I/O traffic comprises a network message between the first compute node and the peripheral.

7. The memory network of claim 1, wherein the peripheral is selected from among a network interface controller, an I/O controller, a storage controller, and a bridging device bridging memory networks.

8. The memory network of claim 1, wherein the memory traffic and the I/O traffic include packets routed by the first memory node toward a final destination.

9. The memory network of claim 8, wherein the memory traffic includes a message including a pointer to a data block in a given memory node, and a receiver of the message is to fetch the data block from the given memory node using the pointer.

10. A first memory node for a memory network including memory nodes and compute nodes, wherein the memory nodes execute memory access commands for the compute nodes, the first memory node comprising:

a memory to store data blocks that are cached in the compute nodes;

a controller to:
execute a first memory access command destined for the first memory node, and
combine a second memory access command and a cache coherency message associated with the second memory access command into a single transaction, the second memory access command to be executed by a second memory node; and a switch to:
route other traffic in the memory network toward a destination, wherein the other traffic includes input/output (I/O) traffic between the compute nodes and peripherals connected to the memory network, and
send the single transaction to the second memory node.

11. The first memory node of claim 10, wherein the peripherals to which the other traffic is routed include at least one of a network interface controller, an I/O controller, a storage controller, and a bridging device bridging memory networks.

12. The first memory node of claim 10, wherein the cache coherency message is for a cache coherency protocol including at least one of a snoop-based and a directory-based cache coherency protocol.

13. The first memory node of claim 10, wherein the memory network comprises a shared non-coherent memory system or a non-shared memory system.

14. A method executed by a first memory node including a first memory and control logic, wherein the first memory node is in a memory network including memory nodes and compute nodes, and wherein the memory nodes operate as memory for the compute nodes, the method comprising:
storing data blocks for the compute nodes in the memory;
routing a first memory access command from the first memory node to a second memory node in the memory network, wherein the routing of the memory access command comprises combining the first memory access command and a cache coherency message associated with the first memory access command into a single transaction, and sending the single transaction to the second memory node; and
routing other traffic in the memory network, wherein the other traffic includes input/output (I/O) traffic between the compute nodes and peripherals connected to the memory network.

15. The memory network of claim 1, wherein the first memory node includes a stacked memory comprising a plurality of memory dies and a base logic layer on which the plurality of memory dies is provided, the base logic layer including a memory controller to process a memory access command, and a switch to route the first memory access command.

16. The memory network of claim 3, wherein the directory is distributed across a plurality of the memory nodes.

17. The first memory node of claim 10, wherein the cache coherency message is for a directory-based cache coherency protocol.

18. The first memory node of claim 17, wherein the directory-based cache coherency protocol uses a directory having a plurality of portions stored across a plurality of memory nodes including the first memory node, the directory including entries storing respective statuses of cached data blocks.

19. The first memory node of claim 10, comprising a stacked memory including a plurality of memory dies and a base logic layer on which the plurality of memory dies is provided, the base logic layer including a memory controller to process a memory access command, and a switch to route the first memory access command.

* * * * *